United States Patent [19]

Parulski

[11] Patent Number: 4,896,207
[45] Date of Patent: Jan. 23, 1990

[54] COLOR IMAGING APPARATUS EMPLOYING A HORIZONTAL STRIPE COLOR FILTER TO REDUCE RISE-TIME ARTIFACTS

[75] Inventor: Kenneth A. Parulski, Rochester, N.Y.

[73] Assignee: Eastman Kodak Company, Rochester, N.Y.

[21] Appl. No.: 208,302

[22] Filed: Jun. 17, 1988

[51] Int. Cl.$^4$ .............................................. H04N 9/04
[52] U.S. Cl. ........................................ 358/44; 358/41
[58] Field of Search ............................. 358/41, 43, 44

[56] References Cited

U.S. PATENT DOCUMENTS

| | | | |
|---|---|---|---|
| 3,472,948 | 10/1969 | Hecker | 358/43 |
| 3,548,087 | 12/1970 | Shimada | 358/43 |
| 3,971,065 | 7/1976 | Bayer | 358/41 |
| 4,054,906 | 10/1977 | Yamanaka | 358/43 |
| 4,059,839 | 11/1976 | Yamanaka et al. | 358/44 |
| 4,117,510 | 9/1978 | Ohta et al. | 358/44 |
| 4,149,182 | 4/1979 | Yamanaka et al. | 358/43 |
| 4,205,336 | 5/1980 | Nagumo | 358/43 |
| 4,236,176 | 11/1980 | Nagumo | 358/43 |
| 4,237,477 | 12/1980 | Weimer | 358/44 |
| 4,246,598 | 1/1981 | Bock et al. | 358/43 |
| 4,293,871 | 10/1981 | Macovski | 358/44 |
| 4,437,112 | 3/1984 | Tanaka et al. | 358/44 |
| 4,500,913 | 2/1985 | Hashimoto et al. | 358/44 |
| 4,541,010 | 9/1985 | Alston | 358/43 |
| 4,567,510 | 1/1986 | Tanaka et al. | 358/44 |
| 4,591,900 | 5/1984 | Heed et al. | 358/44 |
| 4,605,956 | 8/1986 | Coh | 358/44 |
| 4,630,106 | 12/1986 | Morimura et al. | 358/44 |
| 4,642,678 | 2/1987 | Coh | 358/44 |
| 4,663,661 | 5/1987 | Weldy et al. | 358/44 |
| 4,668,975 | 5/1987 | Kuwayama et al. | 358/44 |

FOREIGN PATENT DOCUMENTS

| | | | |
|---|---|---|---|
| 53-79434 | 7/1978 | Japan | 358/44 |
| 53-79435 | 7/1978 | Japan | 358/44 |
| 56-158586 | 12/1981 | Japan | 358/43 |
| 56-158587 | 12/1981 | Japan | 358/44 |

OTHER PUBLICATIONS

"Color Filters and Processing Alternations for One-Chip Cameras, K. A. Parulski", IEEE Transaction on Electron Devices, vol. Ed. 32, No. 8, Aug. 1985, pp. 1381-1389.

Primary Examiner—James J. Groody
Assistant Examiner—Mark R. Powell
Attorney, Agent, or Firm—David M. Woods

[57] ABSTRACT

Video imaging apparatus avoids rise-time artifacts due to analog bandwidth limitations by orienting a multigreen color filter array so that the luminance (green) elements are parallel to the high-speed, horizontal line scanning direction. Rise-time delays in the analog signal processing due to high frequency horizontal scanning are accommodated by having the critical green elements side-by-side in the horizontal direction rather than separated by red and blue elements. This additionally permits line-by-line switching during signal processing to correct for color balance.

9 Claims, 2 Drawing Sheets

(PRIOR ART)

← LINE SCANNING DIRECTION

(PRIOR ART)

FIG. 5

COLOR IMAGING APPARATUS EMPLOYING A HORIZONTAL STRIPE COLOR FILTER TO REDUCE RISE-TIME ARTIFACTS

BACKGROUND OF THE INVENTION

Field of the Invention

This invention is related to the field of color video recording and reproduction and, more particularly, to a video recording apparatus employing a single image sensor and a single, multi-color filter array.

BRIEF DESCRIPTION OF THE DRAWINGS

The prior art and the invention will be described in relation to the drawings, in which:

FIG. 1 shows a known checkerboard color filter array for an image sensor;

FIG. 2 shows a known multi-green filter array for an image sensor;

FIGS. 5(A) through 5(E) show other representations of a horizontal stripe color filter array.

DESCRIPTION RELATIVE TO THE PRIOR ART

Figure 3:
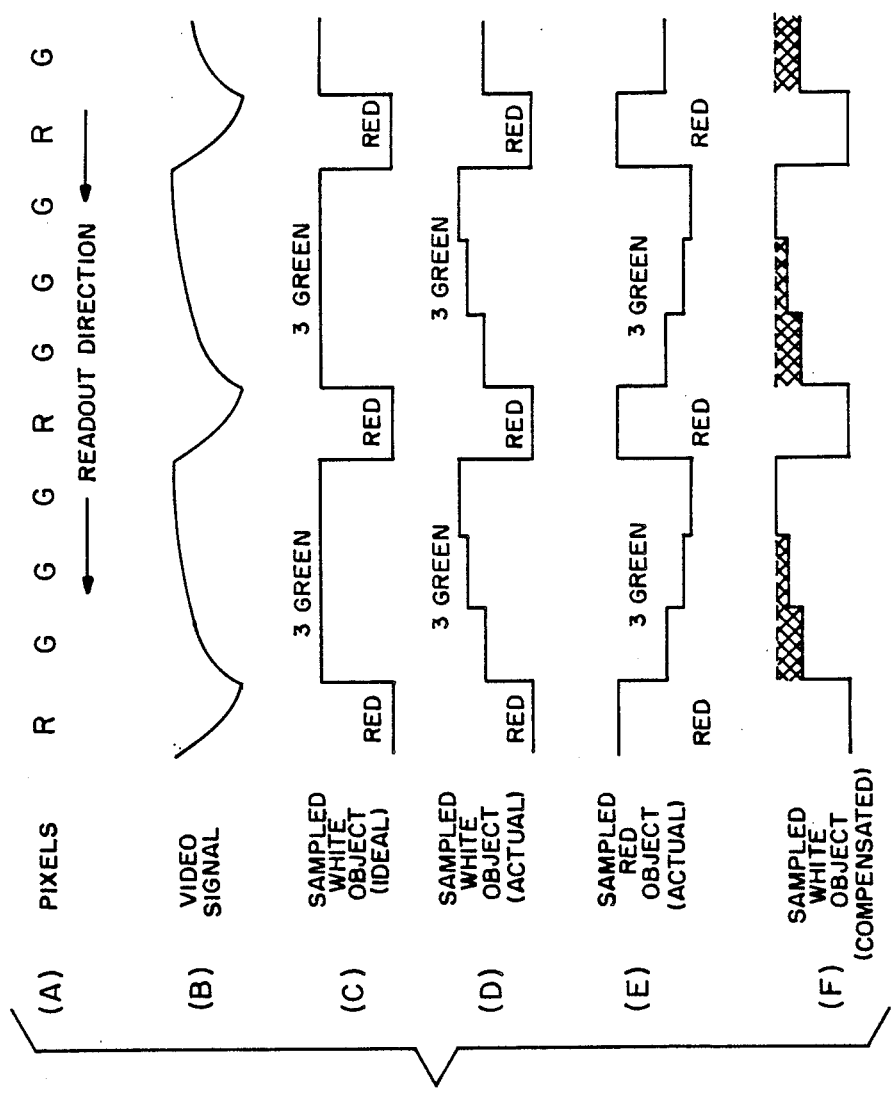
FIG. 3 shows waveforms helpful in describing rise-time problems associated with use of the color filter array of FIG. 2.

A color video camera should be able to generate an image that accurately replicates the colors of an object. Such a color image is obtained from a single solid-state image sensor by covering its photosites with a repetitive pattern of color filters. A particularly telling test is whether the signals generated by same-color photosites have the same value when exposed to a uniformly colored area of the object. Because of the peak spectral sensitivity of the human visual system as well as the requirements of a color television signal, this test is especially important for the luminance color, which is generally green or some green-related color.

Even under the best of circumstances, an analog signal processing circuit introduces a bandwidth limitation into the processing of an otherwise "color-correct" signal from the sensor. Because the video processing rates depend on the elemental division of the sensor, the horizontal readout frequency for a high resolution sensor is typically greater than 10 MHz. Signal processing must be done in rapid-fire synchronism with the horizontal readout clock. Given the analog bandwidth of the signal processing circuit, response is not instantaneous and the signal value from each photosite is affected to some degree by the signal value of the preceding photosite in the readout sequence. That is, a finite time is required for the leading edge of a video signal to change from one color value to another. This introduces a rise-time delay in the signal processing.

Figures 1, 2:
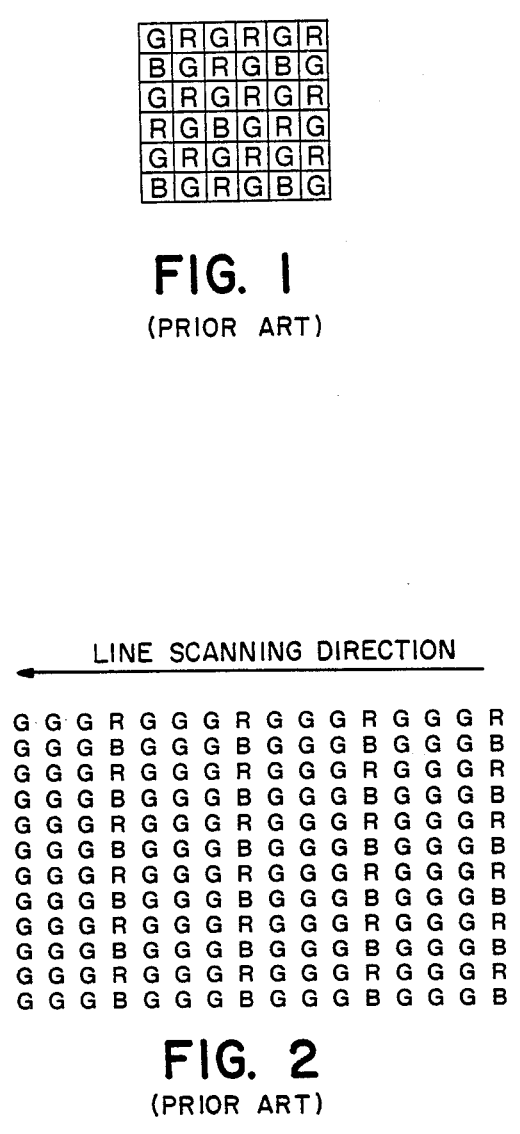

A single sensor camera typically obtains three colors from light transmitted through a single color filter array overlying the image sensor. FIG. 1 shows the checkerboard pattern disclosed in U.S. Pat. No. 3,971,065. Since one color element in a line is always adjacent to a different color element in the same line, each color is basically affected by rise-time delay in the same way. That is, in the pattern of FIG. 1, the green element signal value is affected slightly by the preceding red or blue signal, and likewise the red and blue signal values are affected slightly by the preceding green signal. Such signal carry-over produces a relatively uniform color contamination from one color to the next. This results in a small amount of desaturation in the overall reproduced picture, a minor defect that is ordinarily quite tolerable.

In U.S. Pat. No. 4,663,661, an improved form of signal processing has been employed in connection with the type of color filter array shown in FIG. 2. To make use of this processing, a video camera includes an optical blurring filter having a known spatial (or frequency) function. A color filter is interposed between the blurring filter and an image sensor. FIG. 2 is representative of a family of suitable filters having one chrominance element (e.g. either red or blue) separating repetitive sequences of two or more adjacent luminance elements (e.g., green)—hence the use of "multi-green" to describe such filters. An accurate estimate of the green light blocked by the non-green elements of the filter is recovered by applying the image signal from the sensor to a digital filter and substituting the resultant filter output for the missing green portions. The coefficients of the digital filter are selected in a spacial optimization process that is described in U.S. Pat. No. 4,663,661. The color filter provides an interpolation sequence for the digital filter of at least two green samples on either side of a non-green element. FIG. 2 shows a preferred filter providing three green samples on either side of a red (or blue) element.

Rise-time is a more significant problem for a camera employing a multi-green color filter array as shown in FIG. 2. In uniformly colored areas of the image, the three adjacent green elements should provide the same signal value, although the red or blue values may be significantly different than the green values. The video signal, however, cannot instantaneously change to the green value since a finite time is required for the red or blue value to rise (or fall) to the green value. The first green value following a red or blue value thus is different than its neighboring green values. Even a slight amount of such "crosstalk" between the horizontally adjacent luminance (green) and chrominance (red, blue) values causes a visible fixed pattern artifact (e.g., repetitive vertical stripes) to appear in uniform areas or the image.

The effect of "crosstalk" is illustrated by FIG. 3, which shows several horizontal sample sequences for a small section (FIG. 3(A)) of the color filter of FIG. 2. Consider first the case of a uniformly white object which, due to differing color sensitivities of the image sensor, shows a relatively larger green signal than red signal. The video signal just prior to sampling is shown with typical rise-time delay in FIG. 3(B); it is sampled about midway into an element for purpose of the subsequent waveforms. In the ideal situation (i.e., in the absence of finite rise times as seen in FIG. 3(B)) the signal sample waveform of FIG. 3(C) would be produced. The correct value of the actual green signal, however, lags because of rise-time delays in the analog signal processing circuit. As the analog circuitry cannot respond instantaneously, the low red value prevents the video signal from registering a full green reading for the first green sample value. This produces the sample output shown in FIG. 3(D). The second and third green samples are based on the increasing analog signal, thus approaching the ideal. If the object is uniformly red, the opposite situation prevails (FIG. 3(E)). Since rise-time affects the first green element in the series more than the others, a stripe-like artifact is produced in a display generated from the video signal.

The problem can be addressed by factoring a compensation value into the color signal - an effect shown diagrammatically by the cross-hatched area in FIG. 3(F) for a white object. An appropriate compensation value can be provided in the analog domain by adjusting over-shoot or ringing in the analog circuit. In the digital domain, the first and second green values can be multiplied by fixed amounts. Both techniques, however, only work for one color or one color combination. Another color, such as the red object of FIG. 3(E), requires another set of compensation values. Since preknowledge of object colors is difficult to come by, a predetermined compensation value is of limited usefulness.

SUMMARY OF THE INVENTION

This invention is based on the recognition that signal processing problems can sometimes be better solved by rearranging signal production upstream of the problem than by tinkering with electrical compensation after the defective signal is produced. More particularly, the color pattern of the incoming light can be arranged so that rise time, albeit as present as before, affects the critical color information in the output signal much less than before. By orienting the luminance filter elements so that they are parallel to the direction of high speed readout, rise time affects luminance values only (for a line of luminance). Since nearby elements correlate in the same color, "crosstalk" matters little and no pattern artifact is created. This filter orientation is obtained by rearranging (or "rotating") a multi-green color filter array so that each (former) vertically oriented green column of filter elements becomes horizontally oriented. Red and blue filter elements are, with this orientation, oriented in an alternating red-blue sequence parallel to the direction of high-speed readout. Since a finite rise-time will shift some red signal into the blue, and some blue signal into the red, the output red and blue signal values are evenly affected and the output display is affected by a slight desaturation. But, without any pattern artifact, this is a tolerable outcome.

Besides eliminating a stripe-like pattern in the display, other advantages are obtained by reorienting the color filter array: Color balance, which is ordinarily obtained later in the processing chain by applying a gain change to the already-processed video signal, can be obtained line-by-line right at the image sensor before noise in the processing circuit has an opportunity to affect the signal. Doing it element-by-element at the sensor, as might be suggested for known checkerboard or multi-green color filters, would be unworkable because of the rise-time effect. In addition, in a digital system, redundancy checking has greater validity on colors (RBRB . . . ) separated by one element than on colors (RGGGR . . . ) separated by two or more elements. Furthermore, interpolation for missing green portions will now be done on a vertical sequence of signals, rather than on a horizontal sequence. Because the vertical readout occurs at a much slower speed (typically less than 20 KHz) than the horizontal readout, the signal value of a sensor element involved in the interpolation is much less dependent on the value of an adjacent involved element, that is, one which precedes it during the vertical readout rather than the horizontal readout.

DESCRIPTION OF THE PREFERRED EMBODIMENTS

Figure 4:
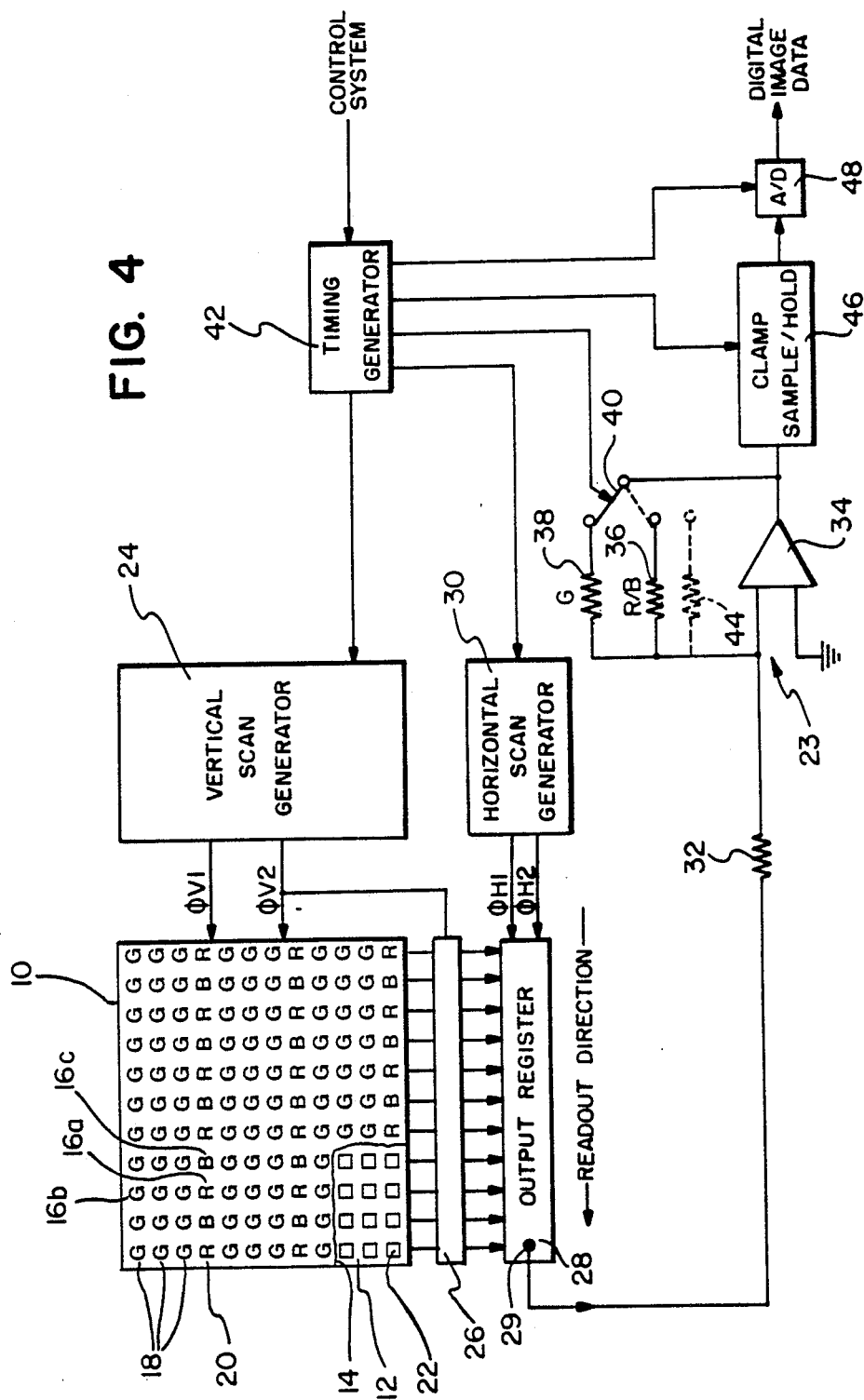
FIG. 4 shows a video imaging device incorporating a horizontal stripe color filter array according to the invention.

Imaging apparatus employing a multi-green horizontal stripe color filter array according to the invention is shown by FIG. 4. A color filter 10 is shown overlying a charge-coupled image sensor 12 (which is shown for illustration through a cut-away portion 14 of the color filter 10). The color filter 10 has a plurality of red, green and blue elements 16a, 16b, 16c arranged in vertically-repetitive sequences of three lines 18 of green elements and one line 20 of alternating red and blue elements. The color filter elements 16a, 16b, 16c cover a plurality of photosites 22 on the sensor 12. Image light striking the sensor 12 is integrated at the photosites 22 according to the image-wise distribution of light intensity. Though not necessary for practice of the invention, the image sensor 12 is used in a still video imaging system in which image light is controlled by an optical shutter (not shown). The shutter is opened so that light strikes the image sensor for a limited period of time. After exposure the shutter is closed and the image charge in the sensor is read out to a signal processing network 23.

A vertical scan generator 24 generates clock phase signals $\phi$V1 and $\phi$V2 for controlling image integration and vertical transfer. The phase signals provide an array of potential wells (corresponding to the integration photosites 22) during the image integration time (when the shutter (not shown) is open), and subsequently transfer the image charge and operate a transfer gate 26 during vertical readout. The image charge is vertically transferred across the image sensor 12 by conventional two-phase complementary clocking of the phase signals $\phi$V1 and $\phi$V2. The readout proceeds with a vertical transfer of charge packets, an entire row at once, through the transfer gate 26 to a high-speed horizontal register 28. Meanwhile, a horizontal scan generator 30 is providing horizontal clock phase signals $\phi$H1 and $\phi$H2 to the horizontal output register 28. Signal charge is clocked out of the horizontal output register via conventional two-phase complementary clocking of the phase signals $\phi$H1 and $\phi$H2. An output capacitative node 29 produces a signal which is amplified and processed in the signal processing circuit 23. An exemplary image sensor employing such clock signal is a 1320(H)×1035(V)-element full-frame CCD imager manufactured by Eastman Kodak Company, Rochester, N.Y. (part number KAF-1400). Such a high definition image sensor typically requires the horizontal output register 28 to operate at greater than 10 MHz.

The line-by-line output signal from the output register 28 is applied through a resistor 32 to an inverting amplifier 34. The gain of the amplifier 34 is adjusted by switching between two resistances, a red/blue gain resistor 36 and a green gain resistor 38. A gain-selecting feedback switch 40 controlled by a timing generator 42 operates in synchronism with the line frequency, that is, in synchronism with the rate at which lines are transferred through the transfer gate 26 to the output register 28, which is typically less than 20 KHz. While in synchronism with the line frequency, the switch 40 need only switch from luminance to chrominance for every third line of green elements in the preferred embodiment (and back to luminance after every line of red/blue elements). The relative gains of green and red/blue lines are therefore equalized by switching the gain of the amplifier 34 on a line-by-line basis. This adjustment is useful since green (luminance) is more critical to color balance than is red or blue (which means, as a practical matter, that a common gain can be used for red or blue, thus avoiding the need to switch on an element-to-element basis for the red/blue line 20). Two gain selections represent satisfactory equalization for a particular light source. Color balance for different light sources can be obtained by switching among further gain factors, a capability shown in broken line by an additional resistor 44 (which is meant to represent one or more additional gain factors).

With the gain properly adjusted, the video signal is clamped and sampled by a clamp, sample and hold circuit 46 and applied to an analog/digital converter 28. Digital image data is output by the A/D converter 48 for further processing. The signal provided to the sample/hold circuit 46 exhibits the usual rise-time effects due to the bandwidth of the analog circuit. But, since green is continuous over a line, the green signal does not exhibit the rapid, repetitive variation due to red or blue elements intermingled among the green elements. Consequently, the green signal absorbs the rise-time delays without the typical stripe artifact seen in the prior art. Rise-time problems in the red/blue line exhibit themselves as a slight color desaturation rather than as a periodic stripe, which is a tolerable consequence. Furthermore, the red and blue elements are spaced every second photosite rather than every fourth photosite as in the known color filter of FIG. 2. This means that the correlation between groups of horizontal red (or blue) elements is significantly greater, thereby allowing redundancy check coding in the digital processing to do a better job of concealing recording errors in the red and blue signals.

The timing generator 42 in responsive to a control system for controlling the vertical and horizontal scan generators 24 and 30, the gain switch 40, the clamp sample/hold circuit 46 and the A/D converter 48. While not part of this invention, the digital filter disclosed in the aforementioned U.S. Pat. No. 4,663,661 may be incorporated in the digital processing of the output signal. If it is, the optical blurring filter operates vertically rather than horizontally and the digital filter is implemented in the vertical direction rather than the horizontal direction, since a trio of green values are arranged vertically on either side of a red or blue value. By having the color filter interpolation sequence oriented in a vertically-repetitive pattern, color "crosstalk" between color elements of the sequence is virtually eliminated as the time difference between samples is determined by the lower-speed vertical scanning frequency, which is typically less than 20 KHz. Calculating a green value for the red or blue location thus involves, e.g., a series of six line delays so that six green values can be accessed at the same time. Such delays and other ancillary processing are provided in the digital processing subsequent to the stage 48 of A/D conversion.

Figure 5:
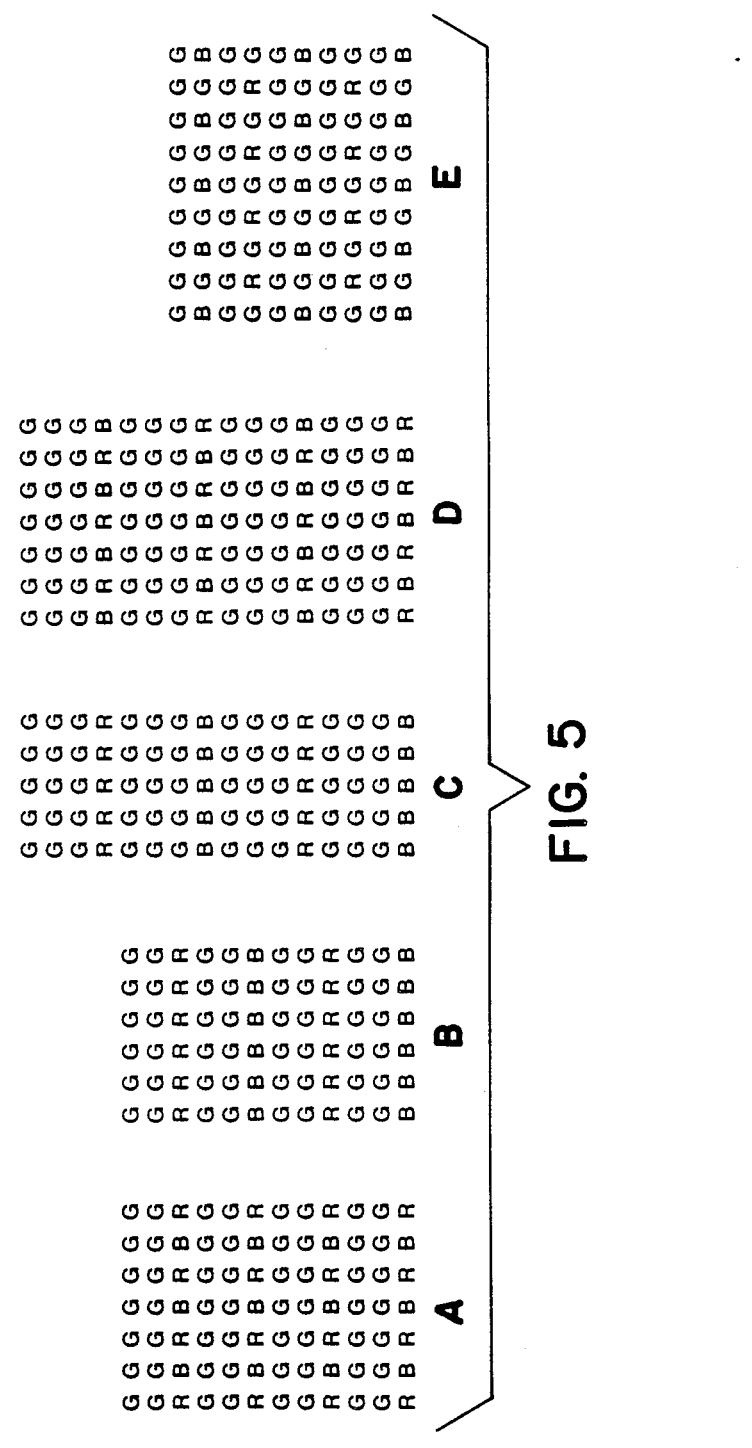

The horizontal three-green and alternating red/blue pattern shown in connection with FIG. 4 is presently the preferred color filter array. However other color filter arrays can obtain the benefits of the invention. For example, FIG. 5(A) shows a two-green filter that is otherwise the same as the color filter array of FIG. 4. FIGS. 5(B) and 5(C) show two-green and three-green filters, respectively, each having the green-line sequences separated by alternating lines of red and blue filter elements. FIG. 5(D) shows a three-green filter in which in the red/blue sequence is inverted from one line to the next. FIG. 5(E) shows a red/blue checkerboard arrangement with offset three green sequences. FIG. 5 is not intended to be exhaustive and many other patterns would clearly be within reach of the invention. Furthermore, the red, green and blue filter elements may be replaced with other colors representative of luminance and chrominance, such as: yellow, transparent, and cyan elements; magenta, yellow and cyan elements; or red, transparent and cyan elements.

The invention has been described in detail with particular reference to a presently preferred embodiment, but it will be understood that variations and modifications can be effected within the spirit and scope of the invention.

What is claimed is:

1. Imaging apparatus for generating a color video representation of an object, said apparatus comprising:
   an area image sensor having a high speed horizontal scan and a relatively lower speed vertical scan, said sensor having a plurality of light-sensitive areas arranged two-dimensionally in parallel lines each oriented lengthwise in the horizontal high speed scanning direction;
   a color filter array having parallel horizontal lines of colored filter elements overlying respective lines of light-sensitive areas, said color filter array having a vertically repetitive pattern comprising at least three adjacent lines of same-color filter elements oriented in the horizontal scanning direction and a line of filter elements including at least one other color oriented in the horizontal scanning direction; and
   means for horizontally and vertically scanning said image sensor and for generating an output signal, said output signal comprising a repetitive color video sequence of at least three lines of the same color and one line including said other color.

2. Imaging apparatus as claimed in claim 1 in which said adjacent lines of the same-color filter elements comprise lines of luminance-responsive filter elements.

3. Imaging apparatus as claimed in claim 2 in which said line of filter elements including at least one other color comprises a line of chrominance-responsive filter elements.

4. Imaging apparatus as claimed in claim 1 in which said two lines of same-color filter elements comprise at least three adjacent lines of green filter elements.

5. Imaging apparatus as claimed in claim 4 in which said line of filter elements including at least one other color comprises a repetitive sequence of red and blue filter elements.

6. Imaging apparatus for generating a color video representation of an object, said apparatus comprising:
   an area image sensor having a high speed horizontal scan and a relatively lower speed vertical scan, said sensor having a plurality of light-sensitive areas arranged two-dimensionally in parallel lines each oriented lengthwise in the horizontal high speed scanning direction;
   a color filter array segmented into parallel horizontal lines of colored filter elements overlying respective lines of light-sensitive areas, said color filter array having a vertically repetitive pattern comprising at least three adjacent lines of filter elements of the same color oriented in the horizontal scanning direction and a line of filter elements including a repetitive sequence of two or more colors oriented in the horizontal scanning direction;

means for horizontally and vertically scanning said image sensor and for generating an output signal, said output signal comprising a line repetitive color video sequence of at least three lines of one continuous color and one line of an alternating sequence of colors;

a gain-controlled processing stage for processing said output signal, said processing stage being switched between one gain value for the lines of continuous color and at least one other gain value for the line of alternating color; and means for switching between said gain values on a line-by-line basis.

7. Imaging apparatus as claimed in claim 6 in which said vertically repetitive pattern comprises three adjacent lines of green filter elements bordered by a line of alternating red and blue filter elements.

8. In a color imaging system of the type having a color-responsive image sensor and a color filter interpolation sequence based on one color filter element being separated by two or more filter elements of a luminance-responsive color, said system operating in an electrical environment requiring high processing frequencies and having a propensity for crosstalk between colors caused by rise-time delays in an ancillary analog processing circuit; the improvement wherein the imaging system comprises;

an area image sensor having a high speed horizontal scanning frequency and a relatively lower speed vertical scanning frequency, said sensor having a plurality of light-sensitive photosites arranged two-dimensionally in parallel lines each oriented lengthwise in the horizontal high speed scanning direction; and a color filter array segmented into parallel horizontal lines of colored filter elements overlying respective lines of photosites, said color filter array having a vertically repetitive pattern comprising at least two adjacent lines of the luminance-responsive color filter elements oriented in the horizontal scanning direction bordered by a line of filter elements including a repetitive sequence of two or more colors oriented in the horizontal scanning direction, said area image sensor in combination with said color filter array providing a sequential input signal for said interpolation sequence comprising at least two adjacent lines of luminance-responsive color filter elements separated by single lines of filter elements including said two or more colors, said vertically repetitive pattern orienting the color filter interpolation sequence in the lower-speed vertical scanning direction so that color crosstalk is minimized.

9. An imaging system as claimed in claim 8 in which said vertically repetitive pattern comprises three adjacent lines of green filter elements bordered by a line of alternating red and blue filter elements, said vertically repetitive pattern orienting the color filter interpolation sequence in the vertical direction so that a vertical array of three green filter elements on either side of a red or blue filter element are used in the interpolation sequence.

* * * * *

UNITED STATES PATENT AND TRADEMARK OFFICE
CERTIFICATE OF CORRECTION

PATENT NO.   : 4,896,207
DATED        : January 23, 1990
INVENTOR(S)  : Kenneth A. Parulski It is certified that error appears in the above-identified patent and that said Letters Patent is hereby corrected as shown below:

Column 6, line 46, delete the word --two--.

Signed and Sealed this

Thirteenth Day of August, 1991

*Attest:*

HARRY F. MANBECK, JR.

*Attesting Officer*    *Commissioner of Patents and Trademarks*